United States Patent
Kikuchi et al.

(10) Patent No.: US 10,389,255 B2
(45) Date of Patent: Aug. 20, 2019

(54) INSULATED SYNCHRONOUS RECTIFICATION DC/DC CONVERTER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/059,432

(22) Filed: Mar. 3, 2016

(65) Prior Publication Data

US 2016/0261203 A1    Sep. 8, 2016

(30) Foreign Application Priority Data

Mar. 3, 2015   (JP) .................................. 2015-041610

(51) Int. Cl.
*H02M 3/335*    (2006.01)

(52) U.S. Cl.
CPC ... *H02M 3/33523* (2013.01); *H02M 3/33592* (2013.01); *Y02B 70/1475* (2013.01)

(58) Field of Classification Search
CPC .......... H02M 3/33523; H02M 3/33592; Y02B 70/1475; H01L 2924/00
See application file for complete search history.

(56) References Cited

U.S. PATENT DOCUMENTS

| | | | |
|---|---|---|---|
| 6,580,164 B1 * | 6/2003 | Ohie | H01L 23/49575 |
| | | | 257/669 |
| 9,978,756 B2 * | 5/2018 | Kim | H01L 27/11565 |
| 2004/0208024 A1 * | 10/2004 | Nagano | H02M 3/33523 |
| | | | 363/19 |
| 2005/0122753 A1 * | 6/2005 | Soldano | H02M 3/33592 |
| | | | 363/125 |
| 2005/0248964 A1 | 11/2005 | Dalal | |
| 2006/0034108 A1 * | 2/2006 | Amei | H02M 3/33561 |
| | | | 363/125 |
| 2014/0210061 A1 * | 7/2014 | Otremba | H01L 24/97 |
| | | | 257/676 |

(Continued)

FOREIGN PATENT DOCUMENTS

| | | |
|---|---|---|
| CN | 1482726 A | 3/2004 |
| CN | 102882377 A | 1/2013 |

(Continued)

OTHER PUBLICATIONS

JPO Notification of Reasons for Refusal corresponding to JP Application No. 2015-041610; Dated Nov. 27, 2018.

(Continued)

*Primary Examiner* — Jeffrey A Gblende
*Assistant Examiner* — Bart Iliya
(74) *Attorney, Agent, or Firm* — Cantor Colburn LLP

(57) ABSTRACT

A secondary-side module comprises: a synchronous rectification controller that controls a synchronous rectification transistor; and a shunt regulator that generates a current that corresponds to the difference between an output voltage $V_{OUT}$ of a DC/DC converter and the target value of the output voltage, which are housed in a single package. The multiple pins to be connected to the shunt regulator are all laid out along a first side of the package.

9 Claims, 11 Drawing Sheets

(56) References Cited

U.S. PATENT DOCUMENTS

| | | | | |
|---|---|---|---|---|
| 2014/0254206 A1* | 9/2014 | Ou | ................... | H02M 3/33592 363/21.01 |
| 2015/0103567 A1* | 4/2015 | Wang | ............... | H02M 3/33592 363/21.13 |
| 2016/0079876 A1* | 3/2016 | Lin | ................... | H02M 3/33592 363/21.14 |

FOREIGN PATENT DOCUMENTS

| | | | |
|---|---|---|---|
| JP | 2004312954 | A | 11/2004 |
| JP | 2006054961 | A | 2/2006 |
| JP | 2010074959 | A | 4/2010 |
| JP | 2011200083 | A | 10/2011 |

OTHER PUBLICATIONS

SIPO First Office Action corresponding to Application No. 201610121701.X; Dated Dec. 5, 2018.

\* cited by examiner

INSULATED SYNCHRONOUS RECTIFICATION DC/DC CONVERTER

CROSS-REFERENCE TO RELATED APPLICATIONS

This application is based upon and claims the benefit of priority from the prior Japanese Patent Application No. 2015-041610, filed Mar. 3, 2015, the entire contents of which are incorporated herein by reference.

BACKGROUND OF THE INVENTION

Field of the Invention

The present invention relates to an insulated synchronous rectification DC/DC converter.

Description of the Related Art

Various kinds of consumer electronics devices such as TVs, refrigerators, etc., each operate receiving commercial AC electric power from an external circuit. Also, electronic devices such as laptop computers, cellular phone terminals, and tablet terminals are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (AC/DC converter) that performs AC/DC conversion of commercial AC voltage. Alternatively, in some cases, such an AC/DC converter is built into an external power supply adapter (AC adapter) for such an electronic device.

FIG. 1 is a block diagram showing an AC/DC converter 100r investigated by the present inventor. The AC/DC converter 100r mainly includes a filter 102, a rectifier circuit 104, a smoothing capacitor 106, and a DC/DC converter 200r.

The commercial AC voltage $V_{AC}$ is input to the filter 102 via a fuse and an input capacitor (not shown). The filter 102 removes noise included in the commercial AC voltage $V_{AC}$. The rectifier circuit 104 is configured as a diode bridge circuit which performs full-wave rectification of the commercial AC voltage $V_{AC}$. The output voltage of the rectifier circuit 104 is smoothed by the smoothing capacitor 106, thereby generating a converted DC voltage $V_{IN}$.

An insulated DC/DC converter 200r receives the DC voltage $V_{IN}$ via an input terminal P1, steps down the DC voltage $V_{IN}$ thus received so as to generate an output voltage $V_{OUT}$ stabilized to a target value, and supplies the output voltage $V_{OUT}$ thus stabilized to a load (not shown) connected between an output terminal P2 and a ground terminal P3.

The DC/DC converter 200r includes a primary-side controller 202, a photocoupler 204, a shunt regulator 206, an output circuit 210, a synchronous rectification controller 300r, and other circuit components. The output circuit 210 includes a transformer T1, a diode D1, an output capacitor C1, a switching transistor M1, and a synchronous rectification transistor M2. The output circuit 210 has the same topology as those of typical synchronous rectification flyback converters, and accordingly description thereof will be omitted.

The switching transistor M1 connected to the primary winding W1 of the transformer T1 performs switching so as to step down the input voltage $V_{IN}$, thereby generating the output voltage $V_{OUT}$. With such an arrangement, the primary-side controller 202 adjusts the duty ratio of the switching of the switching transistor M1.

The output voltage $V_{OUT}$ of the DC/DC converter 200r is divided by means of resistors R1 and R2. The cathode (K) terminal of the shunt regulator 206 is connected to a light-emitting element (light-emitting diode) on the input side of the photocoupler 204. The anode (A) terminal of the shunt regulator 206 is grounded. The divided voltage (voltage detection signal) $V_{OUT\_S}$ is input to a reference (REF) terminal of the shunt regulator 206. The shunt regulator 206 includes an error amplifier that amplifies the difference between the voltage detection signal $V_{OUT\_S}$ and a reference voltage $V_{REF}$ (not shown) so as to generate an error current $I_{ERR}$ that corresponds to the difference, which is drawn (as a sink current) via the light-emitting element (light-emitting diode) on the input side of the photocoupler 204.

A feedback current $I_{FB}$ flows through a light-receiving element (phototransistor) on the output side of the photocoupler 204 according to the error current $I_{ERR}$ that flows on the secondary side. The feedback current $I_{FB}$ is smoothed by means of a resistor and a capacitor, and is input to a feedback (FB) terminal of the primary-side controller 202. The primary-side controller 202 adjusts the duty ratio of the switching transistor M1 based on the voltage (feedback voltage) $V_{FB}$ at the FB terminal.

The synchronous rectification controller 300r switches on and off the synchronous rectification transistor M2 in synchronization with the switching of the switching transistor M1. The synchronous rectification controller 300r generates a pulse signal in synchronization with the switching of the switching transistor M1. For example, when the switching transistor M1 turns off, a pulse generator sets the pulse signal to a first state (e.g., high level) configured as an instruction to turn on the synchronous rectification transistor M2. When a current $I_S$ that flows through the secondary winding W2 becomes substantially zero in an on period of the synchronous rectification transistor M2, the synchronous rectification controller 300r sets the pulse signal to a second state (low level) configured as an instruction to turn off the synchronous rectification transistor M2. The synchronous rectification controller 300r switches on and off the synchronous rectification transistor M2 according to this pulse signal.

An auxiliary winding W4 is provided on the secondary side of the transformer T1. The auxiliary winding W4, the diode D4, and the capacitor C4 form a second converter. A DC voltage $V_{DC}$ occurs across both ends of the capacitor C4 according to the switching of the switching transistor M1.

The ground (GND) terminal of the synchronous rectification controller 300r is connected to the source of the synchronous rectification transistor M2. The synchronous rectification controller 300r receives, via its power supply (VCC) terminal, a voltage $V_{CC1}$ that develops at a connection node between the diode D4 and the capacitor C4. The source voltage $V_S$ of the synchronous rectification transistor M2 dynamically changes according to the switching of the switching transistor M1. Accordingly, the reference voltage set for the synchronous rectification controller 300r dynamically changes. With such an arrangement, the voltage $V_{CC1}$ at the VCC terminal changes so as to satisfy the relation represented by $V_{CC1}=V_S+V_{DC}$. Thus, the synchronous rectification controller 300r operates using the DC voltage $V_{DC}$ as its power supply voltage.

The above is the overall configuration of the AC/DC converter 100r.

RELATED ART DOCUMENTS

Patent Documents

[Patent document 1]
Japanese Patent Application Laid Open No. 2010-074959

The present inventors have investigated the AC/DC converter 100r shown in FIG. 1, configured such that the shunt regulator 206 and the photocoupler 204 are monolithically integrated as a single module. Such a module will be referred to as a "secondary-side module 400r" hereafter.

FIG. 2 is a diagram showing a pin layout of a secondary-side module 400r investigated by the present inventors. For example, the secondary-side module 400r has an SOP (Small Outline Package) configuration or a DIP (Dual Inline Package) configuration.

The secondary-side module 400r includes a drain (DRAIN) pin (terminal), a switching regulator ground (SR_GND) pin, a gate (GATE) pin, a power supply (VCC) pin, a set (SET) pin, a shunt regulator input (SH_IN) pin, a shunt regulator output (SH_OUT) pin, and a shunt regulator ground (SH_GND) pin.

The DRAIN pin is connected to the drain of the synchronous rectification transistor M2, i.e., the output terminal P2 on a mounting circuit board of the DC/DC converter 200r. Furthermore, the DRAIN pin is connected to a VD pad formed on the synchronous rectification controller 300r configured as a semiconductor chip included in the secondary-side module 400r such that it corresponds to the VD terminal.

The SR_GND pin is connected to the source of the synchronous rectification transistor M2 on the mounting circuit board of the DC/DC converter 200r. Furthermore, the SR_GND pin is connected to a GND pad formed on the synchronous rectification controller 300r configured as a semiconductor chip included in the secondary-side module 400r such that it corresponds to the GND terminal.

The GATE pin is connected to the gate of the synchronous rectification transistor M2 on the mounting circuit board of the DC/DC converter 200r. Furthermore, the GATE pin is connected to an OUT pad formed on the synchronous rectification controller 300r configured as a semiconductor chip included in the secondary-side module 400r such that it corresponds to the OUT terminal.

The VCC pin is connected to one end of the capacitor C4 on the mounting circuit board of the DC/DC converter 200r. Furthermore, the VCC pin is connected to a VCC pad formed on the synchronous rectification controller 300r configured as a semiconductor chip included in the secondary-side module 400r such that it corresponds to the VCC terminal.

The SET pin is connected to a circuit element for setting an operation parameter of the synchronous rectification controller 300r. For example, the SET pin may be connected to a resistor $R_{SET}$ for setting a timer period to be used by the synchronous rectification controller 300r, a capacitor for setting the time constant, a resistor for setting a current value, or the like.

The SH_IN pin is connected to a connection node that connects resistors R1 and R2 on the mounting circuit board of the DC/DC converter 200r. Furthermore, the SH_IN pin is connected to a REF pad formed on the shunt regulator 206 configured as a semiconductor chip included in the secondary-side module 400r such that it corresponds to the reference (REF) terminal.

The SH_OUT pin is connected to a light-emitting element configured as an input side of the photocoupler 204 on the mounting circuit board of the DC/DC converter 200r. Furthermore, the SH_OUT pin is connected to a K pad formed on the shunt regulator 206 configured as a semiconductor chip included in the secondary-side module 400r such that it corresponds to the cathode (K) terminal.

The SH_GND pin is grounded on the mounting circuit board of the DC/DC converter 200r. Furthermore, the SH_GND pin is connected to an A pad formed on the shunt regulator 206 configured as a semiconductor chip included in the secondary-side module 400r such that it corresponds to the anode (A) terminal.

The DC/DC converter 200r shown in FIG. 2 has the following problem.

In the on period of the switching transistor M1, the source voltage $V_S$ of the synchronous rectification transistor M2 becomes a value in the vicinity of $(V_{OUT}+V_F)$. Here, $V_F$ represents the forward voltage of a body diode of the synchronous rectification transistor M2. Conversely, in the off period of the switching transistor M1, the source voltage $V_S$ of the synchronous rectification transistor M2 becomes a value represented by $(-V_{IN} \times N_S/N_P)$. Here, $N_S$ and $N_P$ represent the number of turns of the secondary winding W2 and the number of turns of the primary winding W1, respectively.

Accordingly, the source voltage $V_S$ of the synchronous rectification transistor M2 changes in a very wide range according to the switching of the switching transistor M1. Thus, the reference electric potential (ground plane) of the synchronous rectification controller 300r dynamically changes according to the switching of the switching transistor M1. On the other hand, the reference electric potential (ground plane) of the shunt regulator 206 is set to the ground voltage $V_{GND}$.

In the layout shown in FIG. 2, the SR_GND pin and the SH_IN pin are laid out adjacent to each other such that they are connected to the two chips having different reference electric potentials. Furthermore, the SET pin and the SH_GND pin are laid out adjacent to each other such that they are connected to the two chips having different reference electric potentials.

With such an arrangement, if a short circuit occurs between such two adjacent pins having different power supply planes (different reference electric potentials) (which will be referred to as the "critical adjacent pin short circuit" in the present specification), an overvoltage and/or an overcurrent is applied to and/or flows to circuit elements formed on the synchronous rectification controller 300r configured as a chip and/or circuit elements formed on the shunt regulator 206 configured as a chip, or other circuit elements such as the synchronous rectification transistor M2, the transformer T1, and the diode D4. In some cases, this leads to a problem of degraded circuit reliability. It should be noted that the above-described problem is by no means within the scope of common and general knowledge in the field of the present invention. Furthermore, it can be said that the present inventors have been the first to arrive at such a problem.

SUMMARY OF THE INVENTION

The present invention has been made in order to solve such a problem. Accordingly, it is an exemplary purpose of an embodiment of the present invention to provide a secondary-side module having improved reliability.

An embodiment of the present invention relates to a secondary-side module arranged on a secondary side of an insulated synchronous rectification DC/DC converter. The secondary-side module comprises: a synchronous rectification controller that controls a synchronous rectification transistor; and a shunt regulator that generates a current that corresponds to a difference between an output voltage of the DC/DC converter and a target value of the output voltage. The synchronous rectification controller and the shunt regulator are housed in a single package. Multiple pins to be connected to the shunt regulator are all laid out along a first side of the package.

In a case in which the multiple pins to be connected to the shunt regulator are laid out in a dispersed manner on multiple sides, a pin of the shunt regulator and a pin of the synchronous rectification transistor come to be adjacent to each other on each of such multiple sides. In contrast, with such an embodiment, a pin of the shunt regulator and a pin of the synchronous rectification transistor are not adjacent to each other except for the first side. In other words, such an arrangement is capable of reducing the number of sides along which a pin of the shunt regulator and a pin of the synchronous rectification controller are adjacent to each other, thereby providing improved reliability.

Also, multiple pins to be connected to the synchronous rectification controller may all be laid out along a second side of the package that is opposite to the first side.

In this case, there are zero locations where a pin of the shunt regulator and a pin of the synchronous rectification controller are adjacent to each other, thereby providing further improved reliability.

Also, from among the multiple pins to be connected to the synchronous rectification controller, a pin to be connected to a drain of the synchronous rectification transistor may be laid out on the first side.

The drain of the synchronous rectification transistor is connected to the output terminal via which the output voltage is output from the DC/DC converter. The output voltage of the DC/DC converter is generated with the ground voltage as a reference voltage. Thus, the output voltage of the DC/DC converter does not dynamically change according to the switching of the switching transistor. That is to say, the output voltage of the DC/DC converter is maintained at a substantially constant level. Thus, even if a short circuit occurs between the pin connected to the drain of the synchronous rectification transistor and an adjacent pin of the shunt regulator, such an arrangement is capable of suppressing degradation of reliability.

Also, the synchronous rectification controller and the shunt regulator may separately be integrated on independent semiconductor chips.

Another embodiment of the present invention relates to an insulated synchronous rectification DC/DC converter. The DC/DC converter comprises: a transformer that comprises a primary winding, a secondary winding, and an auxiliary winding; a switching transistor connected to the primary winding of the transformer; a synchronous rectification transistor connected to the secondary winding of the transformer; a diode having an anode connected to the auxiliary winding of the transformer; a capacitor arranged between a cathode of the diode and a source of the synchronous rectification transistor; a photocoupler; a primary-side controller that is connected to an output side of the photocoupler, and that switches on and off the switching transistor according to a feedback signal received from the photocoupler; and the secondary-side module according to any one of the aforementioned embodiments, that controls the synchronous rectification transistor.

Yet another embodiment of the present invention relates to a power supply apparatus (AC/DC converter). The power supply apparatus comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to a load.

Yet another embodiment of the present invention relates to an electronic device. The electronic device comprises: a load; a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage, and that supplies the DC input voltage thus stepped down to the load.

Yet another embodiment of the present invention relates to an AC adapter. The AC adapter comprises: a filter that filters a commercial AC voltage; a diode rectifier circuit that full-wave rectifies an output voltage of the filter; a smoothing capacitor that smoothes an output voltage of the diode rectifier circuit so as to generate a DC input voltage; and the aforementioned DC/DC converter that steps down the DC input voltage so as to generate a DC output voltage.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
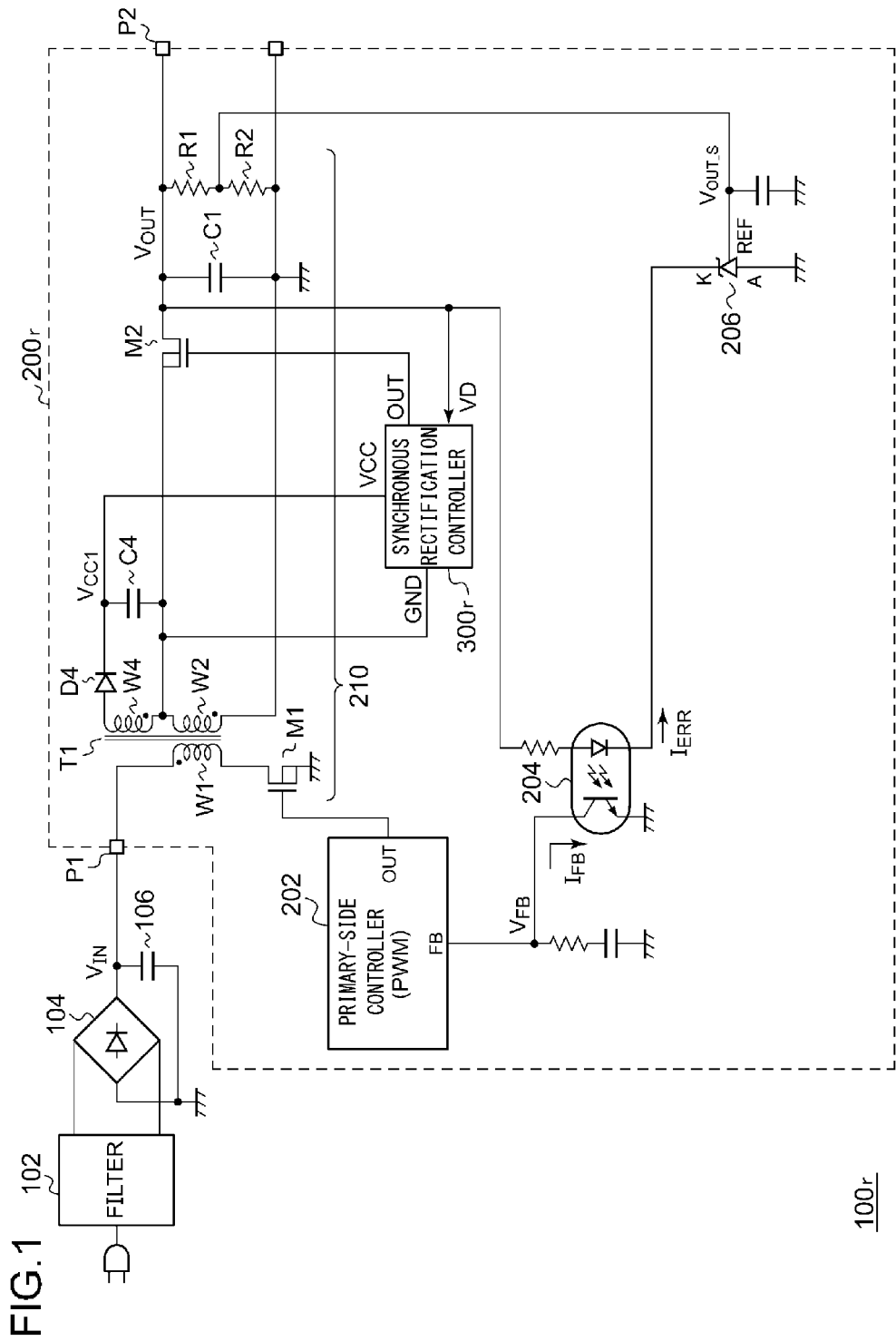
FIG. 1 is a block diagram showing a basic configuration of an AC/DC converter investigated by the present inventor.

The invention will now be described based on preferred embodiments which do not intend to limit the scope of the present invention but exemplify the invention. All of the features and the combinations thereof described in the embodiment are not necessarily essential to the invention.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 3:
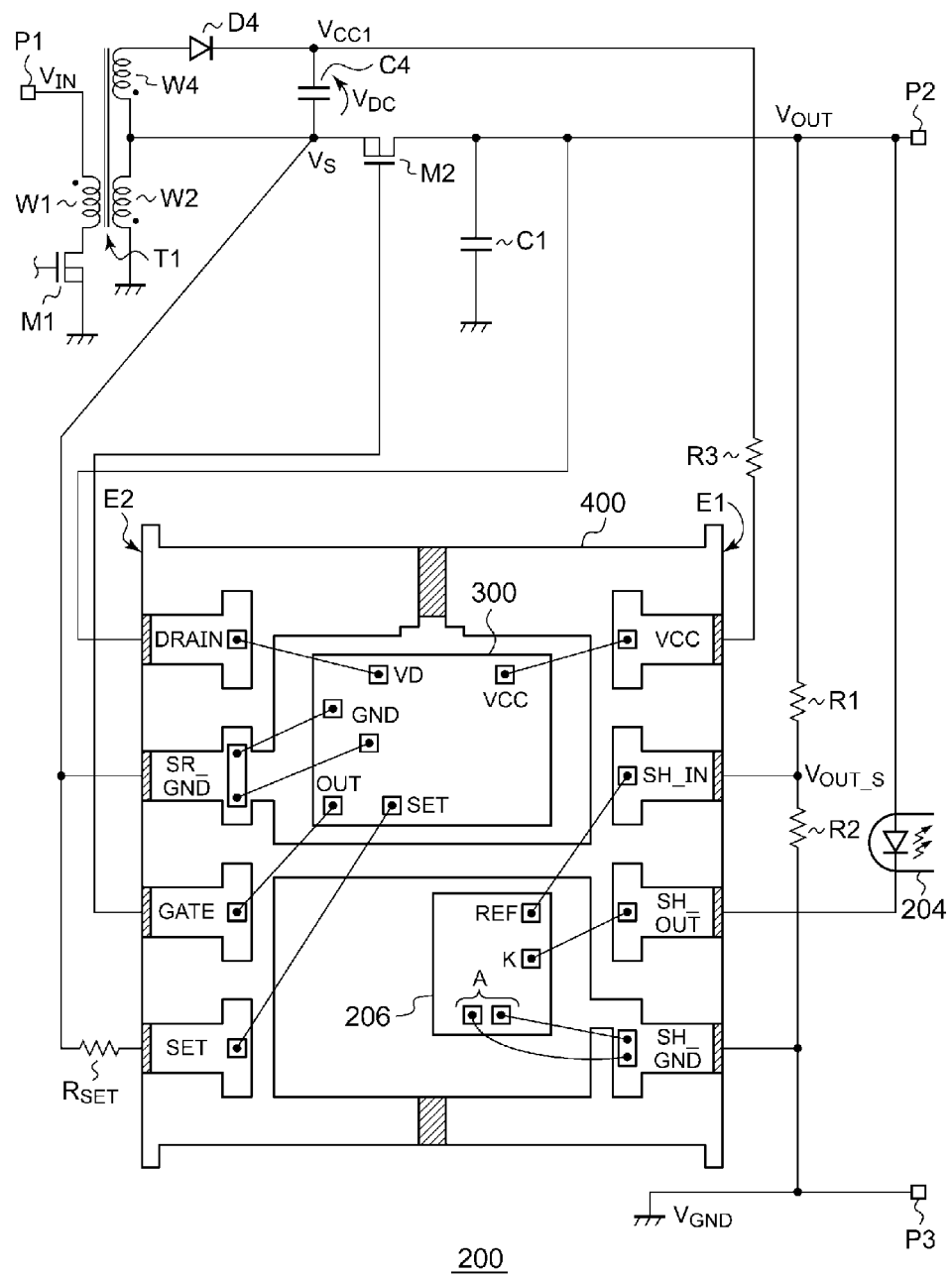
FIG. 3 is a layout diagram as well as a pin layout diagram showing a DC/DC converter including a secondary-side module according to an embodiment.

FIG. 3 is a layout diagram as well as a pin layout diagram showing a DC/DC converter 200 including a secondary-side module 400 according to an embodiment. The DC/DC converter 200 is applicable to an AC/DC converter in the same manner as with the DC/DC converter 200r shown in FIG. 1. Furthermore, the DC/DC converter 200 has the same basic configuration as that of the DC/DC converter 200r shown in FIG. 1.

The secondary-side module 400 includes a semiconductor chip on which a synchronous rectification controller 300 is formed and a semiconductor chip (die) on which a shunt regulator 206 is formed. The secondary-side module 400 is housed in a single package. The synchronous rectification controller 300 controls the turn-on and the turn-off of the synchronous rectification transistor M2 in synchronization with the switching of the switching transistor M1 arranged on the primary side. The shunt regulator 206 generates an error current $I_{ERR}$ that corresponds to the difference between the output voltage $V_{OUT}$ of the DC/DC converter 200 and its target value, which flows as a sink current from a light-emitting diode of a photocoupler 204. Specific configurations of the synchronous rectification controller 300 and the shunt regulator 206 are not restricted in particular. Rather, the synchronous rectification controller 300 and the shunt regulator 206 may be configured using known or prospectively available techniques.

The secondary-side module 400 is provided with the VCC pin, SR_GND pin, GATE pin, DRAIN pin, SET pin, SH_IN pin, SHOUT pin, and SH_GND pin. Each pin is laid out in the same manner as described above with reference to FIG. 2. It should be noted that the function of the SET pin is not restricted in particular. Also, the SET pin may be eliminated.

For example, the secondary-side module 400 may have a SOP configuration or a DIP configuration. Also, the secondary-side module 400 may have other package configurations such as a QFP (Quad Flat Package) configuration.

The package has multiple pins arranged in a first direction along a first side E1 and a second side E2. In FIG. 3, the number of pins arranged along the first side E1 and the number of pins arranged along the second side E2 are the same (K=4). Two semiconductor chips on which the synchronous rectification controller 300 and the shunt regulator 206 are respectively integrated are laid out in the first direction.

All N (N represents an integer of 2 or more) multiple pins connected to the shunt regulator 206, i.e., the SH_IN pin, the SH_OUT pin, and the SH_GND pin, are laid out such that they are adjacent to each other along the first side E1. It should be noted that the alignment sequence of the multiple pins connected to the shunt regulator 206, i.e., the alignment sequence of the SH_IN pin, the SH_OUT pin, and the SH_GND pin, is not restricted in particular. The alignment sequence may preferably be determined giving consideration to the chip layout of the shunt regulator 206, the layout of external components of the secondary-side module 400, the wiring layout of the circuit board mounting the DC/DC converter 200, or the like. Similarly, the alignment sequence of multiple pins connected to the synchronous rectification controller 300, i.e., the alignment sequence of the DRAIN pin, the SR_GND pin, the GATE pin, and the SET pin, is not restricted in particular.

The other pins, i.e., M (M represents an integer of 2 or more) multiple pins connected to the synchronous rectification controller 300, are laid out in a concentrated manner along the second side E2, which is opposite to the first side E1. In a case in which the number of pins M connected to the synchronous rectification controller 300 is greater than the number of pins K arranged along the second side E2, a part of the pins (e.g., (M−K) pins) connected to the synchronous rectification controller 300 may be laid out along the first side E1.

In the secondary-side module 400 shown in FIG. 3, the VCC pin is arranged on the first side E1, and the DRAIN pin, the SR_GND pin, the GATE pin, and the SET pin are arranged along the second side E2. With such an arrangement, the number of pins arranged along the first side E1 matches the number of pins arranged along the second side E2.

Multiple pads are formed on the synchronous rectification controller 300 such that they are associated with the multiple pins. Specifically, the DRAIN pin corresponds to the VD pad. The VCC pin corresponds to the VCC pad. The SR_GND pin corresponds to the GND pads. The GATE pin corresponds to the OUT pad. The SET pin corresponds to the SET pad.

Similarly, multiple pads are formed on the shunt regulator 206 such that they are associated with the multiple pins. Specifically, the SH_IN pin corresponds to the REF pad. The SH_OUT pin corresponds to the cathode (K) pad. The SH_GND pin corresponds to the anode (A) pads.

A given pad and its corresponding pin, which are associated with each other, are electrically connected via wire bonding. Accordingly, each pad is laid out at a position giving consideration to the position of the corresponding pin such that wire bonding can be made between them. It should be noted that the number of pads that correspond to each pin is shown for exemplary purposes only, i.e., is not restricted in particular.

The above is the configuration of the secondary-side module 400 and the configuration of the DC/DC converter 200 employing such a secondary-side module 400. Next, description will be made regarding the advantages thereof.

Figure 2:
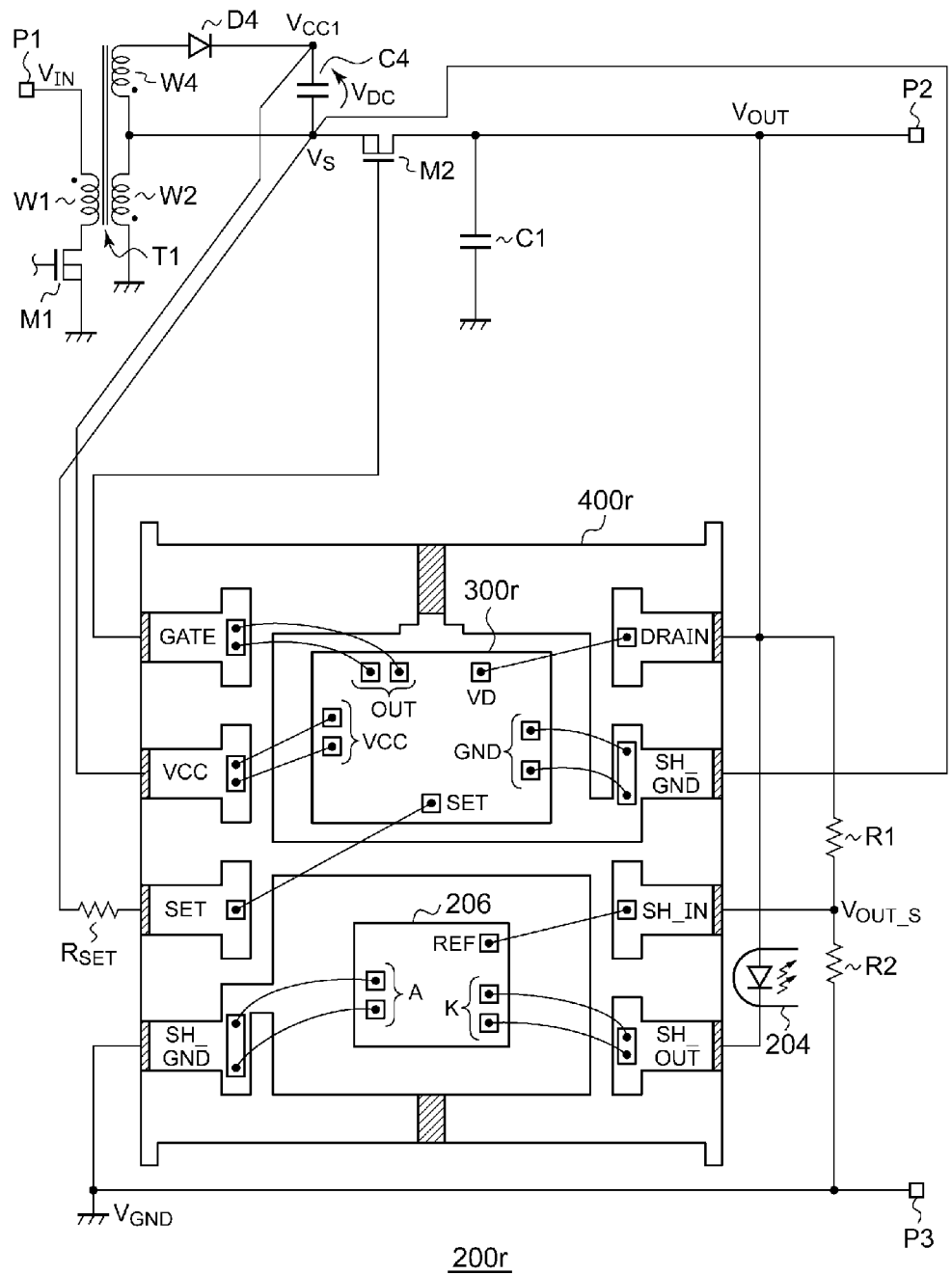
FIG. 2 is a diagram showing a pin layout of a secondary-side module investigated by the present inventor.

By making a comparison with the secondary-side module 400r shown in FIG. 2, the advantages of the secondary-side module 400 according to the embodiment can be clearly understood.

In the secondary-side module 400r shown in FIG. 2, the multiple pins REF, K, and A, which are connected to the shunt regulator 206, are laid out in a dispersed manner along multiple sides (along the sides E1 and E2 in FIG. 2). As a result, along a given side, e.g., along the side E1, a pin of the shunt regulator 206 (SH_IN in FIG. 2) and a pin of the synchronous rectification controller 300r (SR_GND in FIG. 2) are arranged such that they are adjacent to each other. Furthermore, along another side, e.g., along the side E2, a pin of the shunt regulator 206 (SH_GND in FIG. 2) and a pin of the synchronous rectification controller 300r (SET in FIG. 2) are arranged such that they are adjacent to each other. That is to say, there is a risk of degraded reliability due to a critical adjacent pin short circuit along each of the two sides.

In contrast, with the secondary-side module 400 according to the present embodiment, the multiple pins of the shunt regulator 206 are all laid out in a concentrated manner along the first side E1. Thus, along the side E2, which is different from the first side E1, a pin of the shunt regulator 206 and a pin of the synchronous rectification controller 300 are not adjacent to each other.

In the secondary-side module 400 shown in FIG. 3, the number M (five in this example) of pins of the synchronous rectification controller 300 is greater than the number K (four in this example) of pins that can be arranged along a single side. Thus, the VCC pin of the synchronous rectification controller 300 is arranged on the first side E1. With such an arrangement, there is no need for concern about a critical adjacent pin short circuit occurring along the second side E2, thereby suppressing degradation of reliability. On the other hand, there is a risk of the occurrence of a critical adjacent pin short circuit between the VCC pin and the SH_IN pin along the first side E1, which leads to degraded reliability. In order to solve such a problem, by inserting a resistor R3, such an arrangement provides improved reliability.

As described above, with the present embodiment, the number of sides along which any pin of the shunt regulator 206 and any pin of the synchronous rectification controller 300 are arranged such that they are adjacent to each other is one or zero, which is smaller than that shown in FIG. 2. As a result, such an arrangement provides a reduced risk of the occurrence of a critical adjacent pin short circuit, thereby suppressing degradation of the reliability, or thereby providing improved reliability.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

FIRST MODIFICATION

Figure 4:
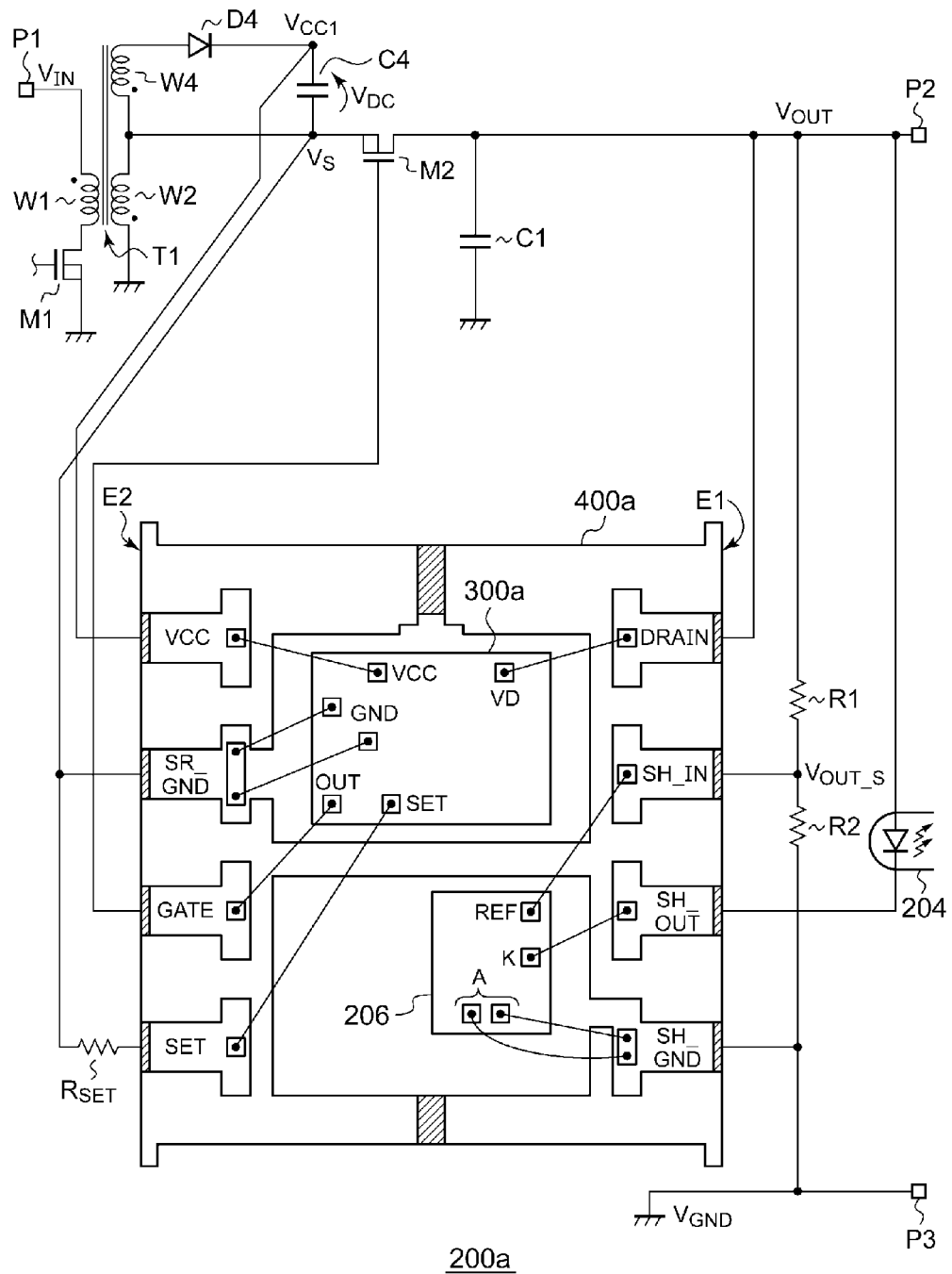
FIG. 4 is a layout diagram as well as a pin layout diagram showing a DC/DC converter including a secondary-side module according to a first modification.

FIG. 4 is a layout diagram as well as a pin layout diagram showing a DC/DC converter 200a including a secondary-side module 400a according to a first modification. In this modification, from among the multiple pins to be connected to the synchronous rectification controller 300, the DRAIN pin, which is to be connected to the drain of the synchronous rectification transistor M2, is laid out on the first side E1.

The drain of the synchronous rectification transistor M2 is connected to the output terminal P2 via which the output voltage $V_{OUT}$ is output from the DC/DC converter 200a. With such an arrangement, the output voltage $V_{OUT}$ of the DC/DC converter 200a is generated with the ground voltage $V_{GND}$ as a reference voltage. Thus, the output voltage $V_{OUT}$ does not dynamically change according to the switching of the switching transistor M1. That is to say, the output voltage $V_{OUT}$ is maintained at a substantially constant level. In other words, the DRAIN pin is a pin that shares the ground voltage $V_{GND}$ with the shunt regulator 206 as a common reference voltage. Thus, even if a short circuit occurs between the DRAIN pin of the synchronous rectification controller 300a and the adjacent pin (SH_IN) of the shunt regulator 206, this does not become a critical adjacent pin short circuit. Thus, such an arrangement is capable of suppressing degradation of reliability.

SECOND MODIFICATION

Figure 5:
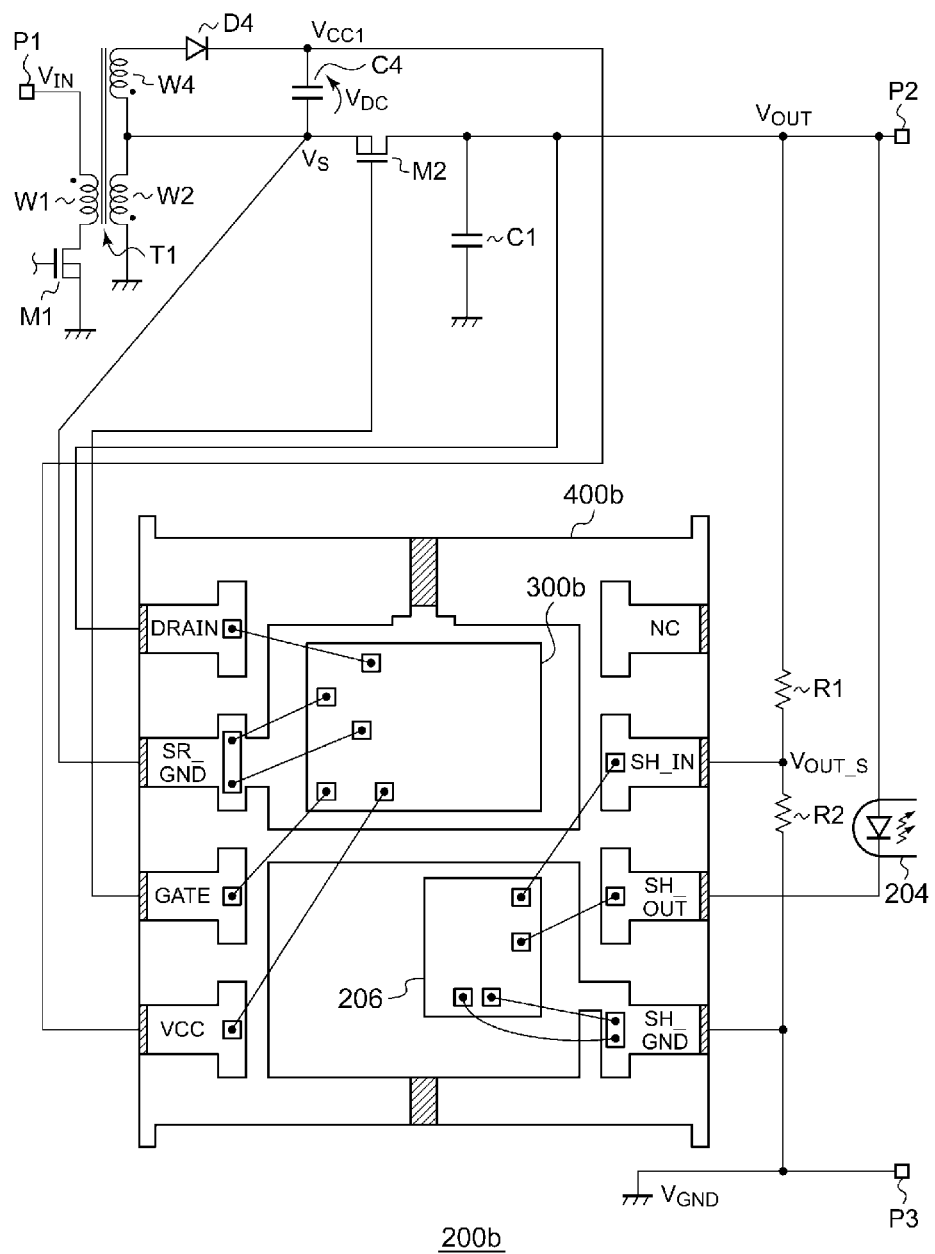
FIG. 5 is a layout diagram as well as a pin layout diagram showing a DC/DC converter including a secondary-side module according to a second modification.

FIG. 5 is a layout diagram as well as a pin layout diagram showing a DC/DC converter 200b including a secondary-side module 400b according to a second modification. In this modification, no SET pin is provided. Accordingly, the number of pins (M=4) connected to the synchronous rectification controller 300b is equal to or smaller than the number of pins (K=4) that can be arranged along a single side (i.e., M≤K). In this case, all the multiple pins to be connected to the synchronous rectification controller 300b can be laid out along the second side E2. One pin from among the pins laid out along the first side E1 is configured as a non-connection (NC) pin, or otherwise is used as a GND pin.

With such a modification, there is no portion where any pin of the shunt regulator 206 and any pin of the synchronous rectification controller 300b are arranged adjacent to each other. Thus, such a modification involves no risk of the occurrence of a critical adjacent pin short circuit, thereby providing further improved reliability.

THIRD MODIFICATION

Figure 6:
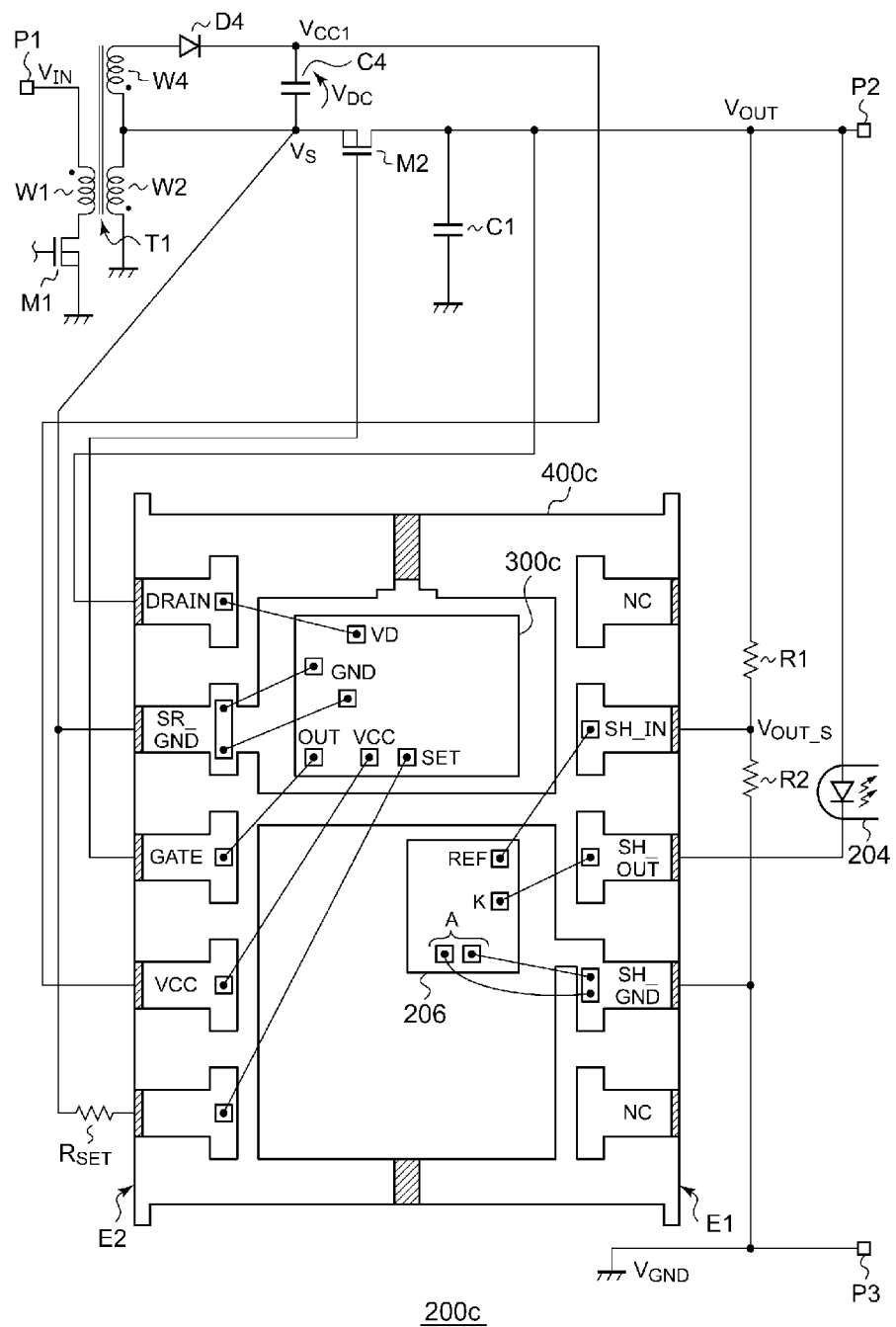
FIG. 6 is a layout diagram as well as a pin layout diagram showing a DC/DC converter including a secondary-side module according to a third modification.

FIG. 6 is a layout diagram as well as a pin layout diagram showing a DC/DC converter 200c including a secondary-side module 400c according to a third modification. In this modification, the number of pins (five) of the synchronous rectification controller 300c is the same as that of the synchronous rectification controller 300 shown in FIG. 3 or FIG. 4. The point of difference is that, in this modification, the number of pins K arranged along each of the first side E1 and the second side E2 is increased to five. Furthermore, the multiple number M of pins to be connected to the synchronous rectification controller 300c are all laid out along the second side E2. Such a modification involves no risk of the occurrence of a critical adjacent pin short circuit, as with the modification shown in FIG. 5, thereby providing further improved reliability.

FOURTH MODIFICATION

Figure 7:
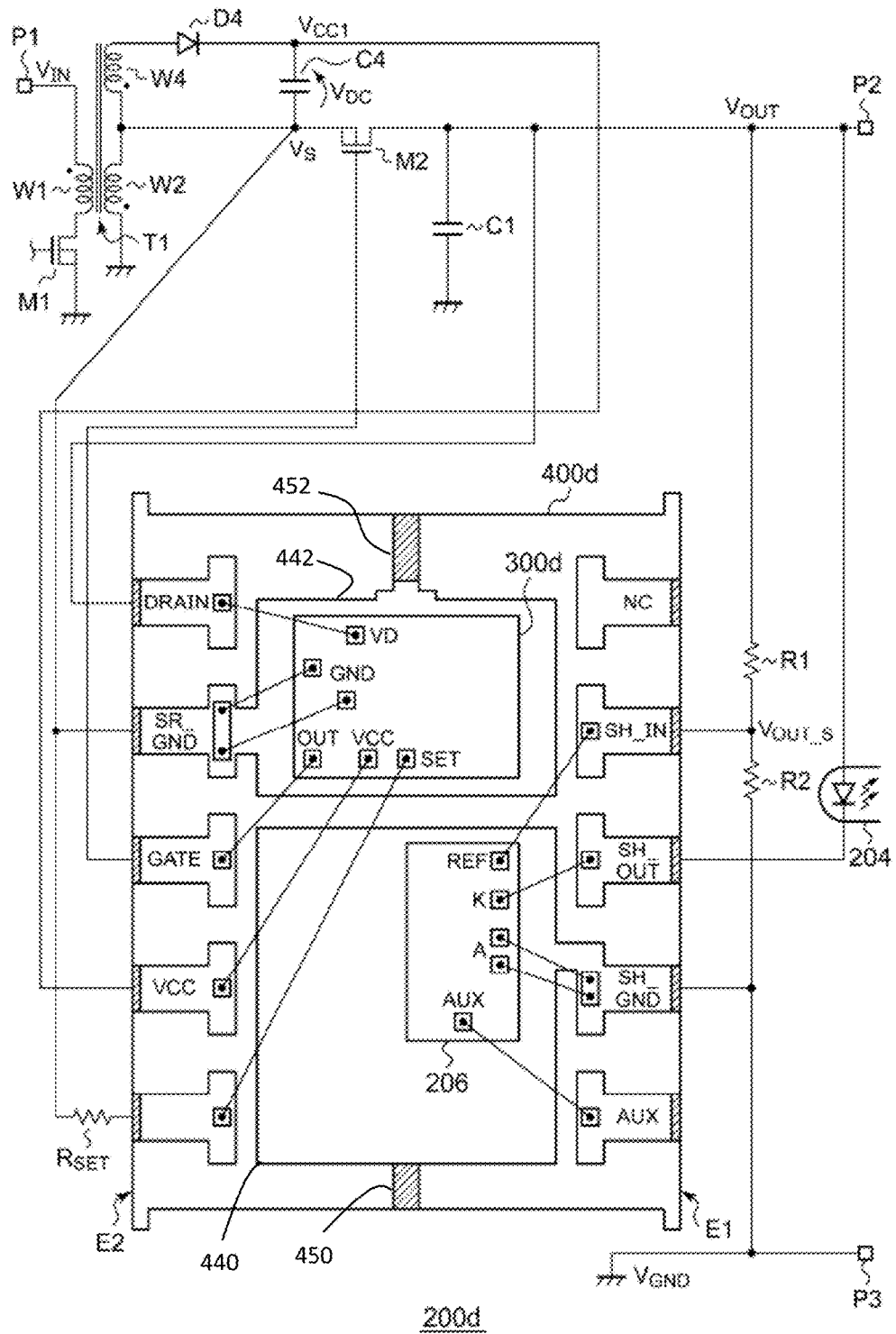
FIG. 7 is a layout diagram as well as a pin layout diagram showing a DC/DC converter including a secondary-side module according to a fourth modification.

FIG. 7 is a layout diagram as well as a pin layout diagram showing a DC/DC converter 200d including a secondary-side module 400d according to a fourth modification. In this modification, the shunt regulator 206 further includes an AUX terminal in addition to the REF terminal, the K terminal, and the A terminal. The function of the AUX terminal is not restricted in particular. An AUX pad that corresponds to the AUX terminal is formed on a semiconductor chip on which the shunt regulator 206d is integrated. Furthermore, the AUX pin that corresponds to the AUX pad is laid out adjacent to any one of the SH_IN, SH_OUT, or SH_GND in the first edge E1 side. FIG. 7 further shows a first portion 450 extending in the first direction from the first island 440 to the third side, and a second portion 452 extending in the first direction from the second island 442 to the fourth side.

Figure 8A:
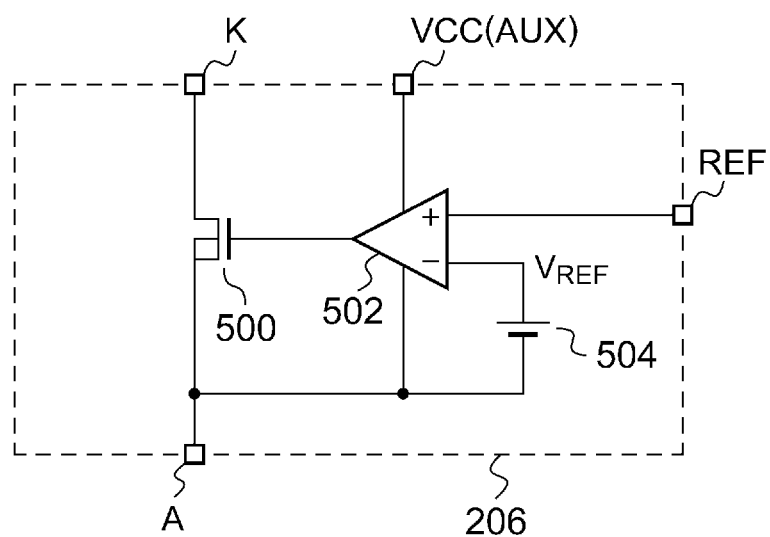
FIGS. 8A and 8B are circuit diagrams each showing an example configuration of a shunt regulator.

FIGS. 8A and B are circuit diagrams each showing an example configuration of the shunt regulator 206. The shunt regulator 206 includes an output transistor 500, an error amplifier 502, and a voltage source 504. The voltage source 504 generates a reference voltage $V_{REF}$. The output transistor 500 is configured as an N-channel MOSFET or otherwise an NPN bipolar transistor. The output transistor 500 is arranged between the cathode terminal K and the anode terminal A. The error amplifier 502 amplifies the difference between the voltage $V_{OUT\_S}$ at the REF terminal and the reference voltage $V_{REF}$ configured as a target value of the voltage $V_{OUT\_S}$, and supplies the error signal thus generated to a control terminal of the output transistor 500.

The output transistor 500 may be configured as a P-channel MOSFET or otherwise a PNP bipolar transistor. In this case, the voltage $V_{OUT\_S}$ is input to the inverting input terminal of the error amplifier 502. Furthermore, the reference voltage $V_{REF}$ is supplied to the non-inverting input terminal of the error amplifier 502.

With typical arrangements, the power supply terminal of the shunt regulator 206 (i.e., the power supply terminal of the error amplifier 502) is also used as the cathode terminal K. However, in the shunt regulator 206 shown in FIG. 8A, the power supply terminal VCC is provided as an AUX terminal in the form of a separate terminal from the cathode terminal K.

Figure 8B:
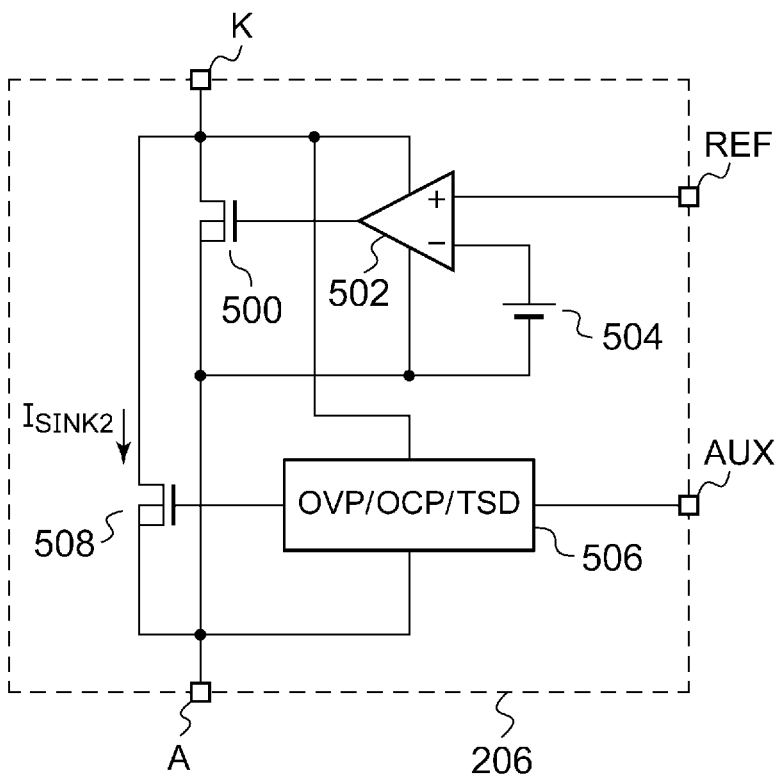

The shunt regulator 206 shown in FIG. 8B has a protection function for the secondary side, examples of which include an overvoltage protection (OVP) function, overcurrent protection (OCP) function, and a thermal shutdown (TSD) function. The AUX terminal receives, as its input signal, a signal that indicates the state of the secondary side such as current, voltage, temperature, or the like. The protection circuit 506 compares the signal thus received via the AUX terminal with a predetermined threshold voltage, so as to detect an abnormal state that can occur in the secondary side. Upon detection of an abnormal state, the protection circuit 506 turns on a protection transistor 508 such that the second current $I_{SINK2}$ is drawn via a current path that differs from a path with the output transistor 500. When the secondary current $I_{SINK2}$ flows, the photocoupler 204 is driven, thereby increasing the feedback current $I_{FB}$ shown in FIG. 1. As a result, the feedback voltage $V_{FB}$ drops to a voltage in the vicinity of 0 V, which suspends the switching operation of the switching transistor M1, thereby providing circuit protection.

FIFTH MODIFICATION

The synchronous rectification controller and the shunt regulator may be integrated on a single semiconductor chip (die). In a case in which two ground planes can be formed on a single semiconductor chip such that they are isolated from each other, the synchronous rectification controller 300 and the shunt regulator 206 can be formed on the same chip.

SIXTH MODIFICATION

Figure 9:
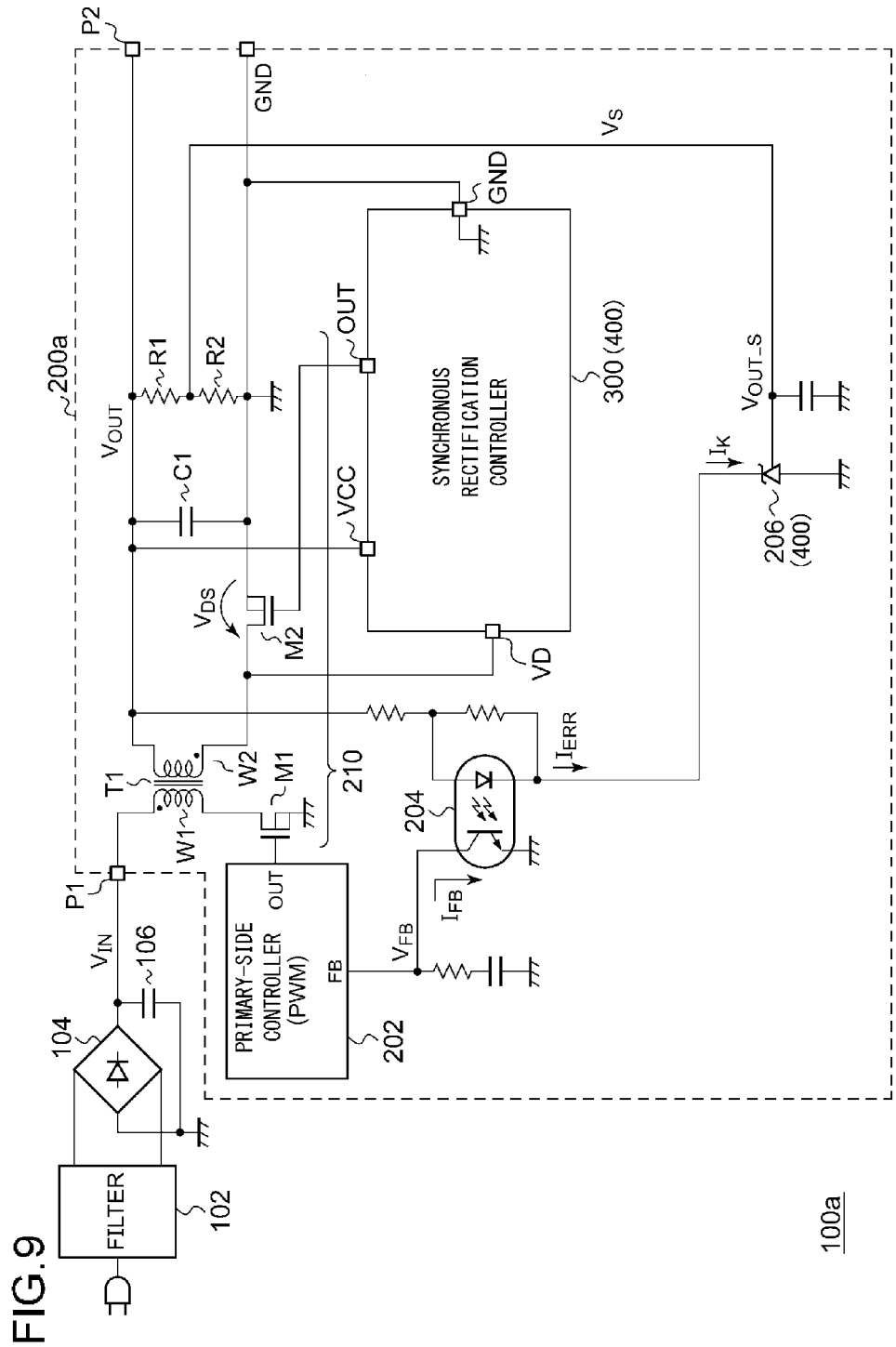
FIG. 9 is a circuit diagram showing a DC/DC converter according to a third modification.

Description has been made in the embodiment regarding an arrangement in which the synchronous rectification transistor M2 is arranged on the output terminal P2 side of the secondary winding W2. Also, the synchronous rectification transistor M2 may be arranged between the secondary winding W2 and the ground. FIG. 9 is a circuit diagram showing a DC/DC converter 200a according to a third modification. The output voltage $V_{OUT}$ of the DC/DC converter 200a is supplied to the VCC terminal of the synchronous rectification controller 300. Furthermore, the synchronous rectification controller 300 is arranged such that its GND terminal is connected to the source of the synchronous rectification transistor M2 and is grounded, its VD terminal is connected to the drain of the synchronous rectification transistor M2, and its OUT terminal is connected to the gate of the synchronous rectification transistor M2. The synchronous rectification controller 300 has the same internal configuration as that shown in FIG. 2. Such a configuration provides the same effects as those provided by the embodiment.

SEVENTH MODIFICATION

Description has been made in the embodiment regarding a flyback converter. Also, the present invention is applicable to a forward converter. In this case, multiple synchronous rectification transistors are arranged on the secondary side of the transformer T1. The synchronous rectification controller may be configured to switch on and off the multiple synchronous rectification transistors. Also, such a converter may be configured as a quasi-resonant converter.

EIGHTH MODIFICATION

At least one of the switching transistor or the synchronous rectification transistor may be configured as a bipolar transistor or an IGBT.

[Usage]

Next, description will be made regarding the usage of the DC/DC converter 200 described in the embodiment.

Figure 10:
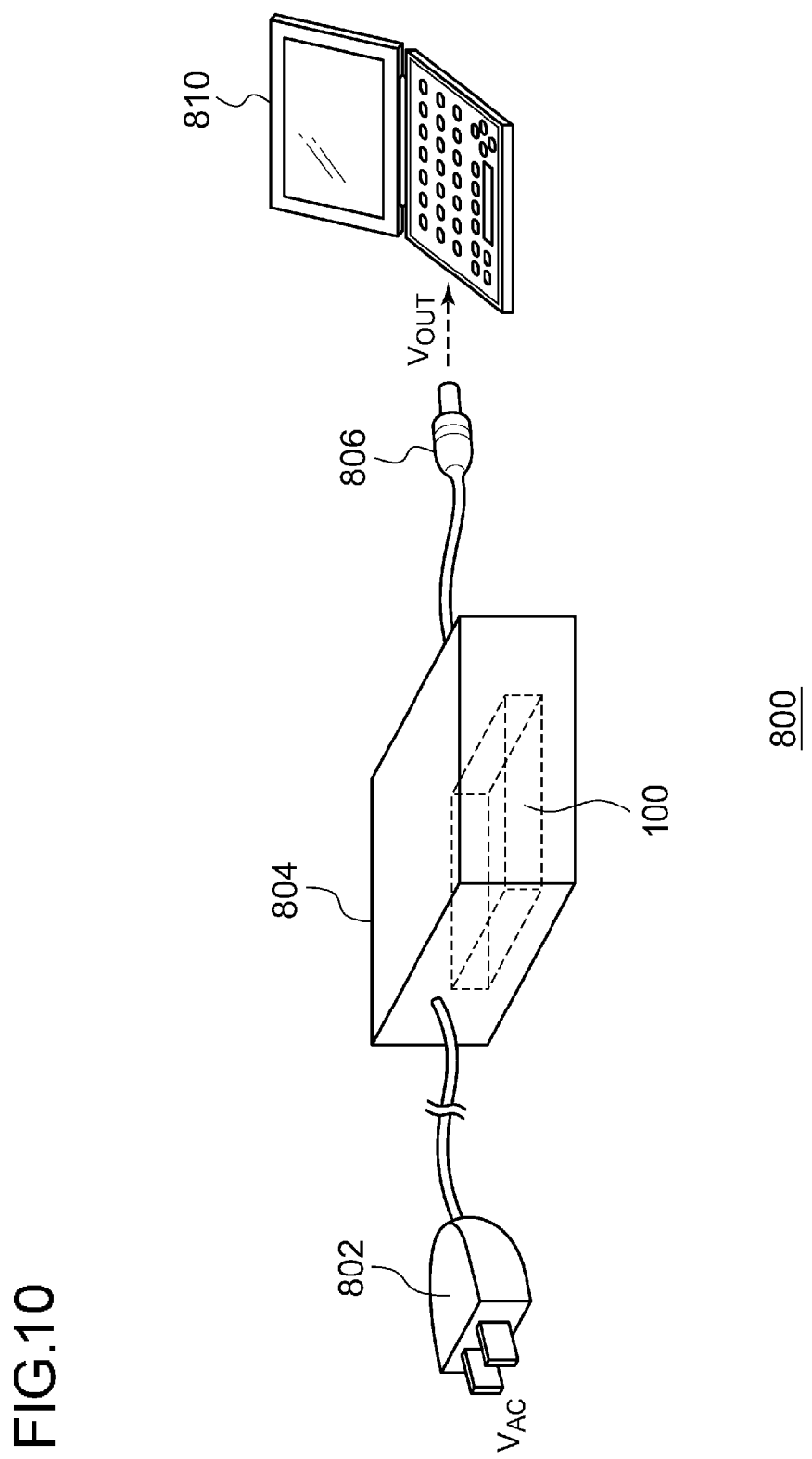
FIG. 10 is a diagram showing an AC adapter including an AC/DC converter.

FIG. 10 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop PCs, digital still cameras, digital video cameras, cellular phones, portable audio players, and the like.

Figure 11A:
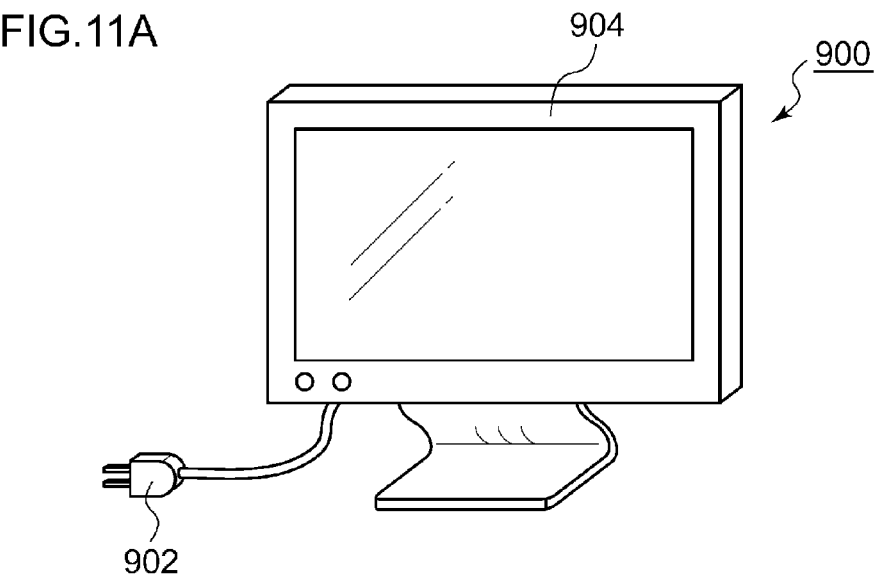
FIGS. 11A and 11B are diagrams each showing an electronic device including an AC/DC converter.
Figure 11B:
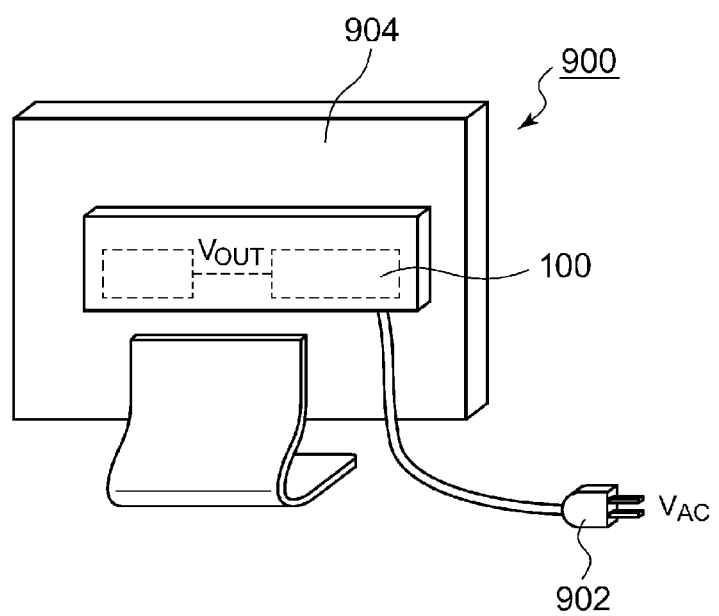

FIGS. 11A and 11B are diagrams each showing an electronic device 900 including the AC/DC converter 100. The electronic device 900 shown in FIGS. 11A and 11B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage V$_{AC}$ from an unshown electrical outlet. The AC/DC converter 100 is mounted within the housing 904. The DC output voltage V$_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. A secondary-side module arranged on a secondary side of an insulated synchronous rectification DC/DC converter, the secondary-side module comprising:
   a shunt regulator integrated on a first chip and structured to generate a current that corresponds to a difference between an output voltage of the DC/DC converter and a target value of the output voltage; and
   a synchronous rectification controller integrated on a second chip and structured to control a synchronous rectification transistor,
   wherein the shunt regulator and the synchronous rectification controller are housed in a single package,
   and wherein the package has a first side and a second side which are parallel and extending in a first direction, and a third side and a fourth side which are parallel and extending in a second direction perpendicular to the first direction,
   and wherein a plurality of pins connected to the first chip are all laid out along the first side,
   and wherein the first chip and the second chip are arranged such that the first chip and the second chip overlap along the first direction,
   and the secondary-side module further comprising:
   a first island on which the first chip is mounted;
   a second island on which the second chip is mounted, wherein the first island and the second island are separated;
   a first portion extending in the first direction from the first island to the third side; and
   a second portion extending in the first direction from the second island to the fourth side.

2. The secondary-side module according to claim 1, wherein two pin located at both ends of the first side is a non-connection pin.

3. The secondary-side module according to claim 1, wherein the first island is larger than the second island.

4. The secondary-side module according to claim 1, wherein the number of pins along the first side and the number of pins along the second side are same.

5. The secondary-side module according to claim 1, wherein one of the plurality of pins connected to the first chip is continuous with the first island, and said one of the plurality of pins connected is coupled to corresponding pad on the first chip via bonding wire.

6. The secondary-side module according to claim 1, wherein one pin connected to the second chip is continuous with the second island, and said one pin is coupled to corresponding pad on the second chip via bonding wire.

7. The secondary-side module according to claim 1, wherein the package has two protuberances (or projections) extending along the first direction at both ends of the third side.

8. The secondary-side module according to claim 1, wherein the package has a first protuberance (or a projection) extending along the first direction at one end of the third side, and a second protuberance (or a projection) extending along the first direction at one end of the fourth side.

9. The secondary-side module according to claim 1, wherein the secondary-side module further comprises a third portion provided between the second portion and the second island, and wherein a width of the third portion is wider than a width of the second portion.

* * * * *